(12) United States Patent
Havrilov et al.

(10) Patent No.: US 12,464,625 B2
(45) Date of Patent: Nov. 4, 2025

(54) TOUCH LIGHT SWITCH

(71) Applicant: AJAX SYSTEMS CYPRUS HOLDINGS LTD, Nicosia (CY)

(72) Inventors: Anton Havrilov, Odesa (UA); Kostiantyn Khodakov, Volyn region (UA); Taras Pavelko, Rivne (UA); Anatolii Zhurbenko, Luhansk region (UA); Andrii Sotnikov, Kharkov (UA); Vitalii Lapa, Poltava region (UA); Ivan Ovcharyk, Kyiv region (UA)

(73) Assignee: AJAX SYSTEMS CYPRUS HOLDINGS LTD, Nicosia (CY)

( * ) Notice: Subject to any disclaimer, the term of this patent is extended or adjusted under 35 U.S.C. 154(b) by 141 days.

(21) Appl. No.: 18/475,542

(22) Filed: Sep. 27, 2023

(65) Prior Publication Data
US 2024/0314910 A1    Sep. 19, 2024

(30) Foreign Application Priority Data
Mar. 17, 2023    (UA) .............................. a 2023 01117

(51) Int. Cl.
*H05B 47/115* (2020.01)
*H01H 9/02* (2006.01)

(52) U.S. Cl.
CPC ............. *H05B 47/115* (2020.01); *H01H 9/02* (2013.01)

(58) Field of Classification Search
CPC .. H02M 1/32; H02G 3/18; H02G 3/14; H02G 3/083; H02G 3/081; H02G 3/00; H01R 33/945; H01R 33/90; H01R 31/065; H01R 24/78; H05B 47/115; H05B 47/19; H01H 9/02; H01H 9/0271; H01H 2300/03
See application file for complete search history.

(56) References Cited

U.S. PATENT DOCUMENTS

| 11,264,769 | B1* | 3/2022 | King | H02M 1/32 |
| 2018/0011574 | A1* | 1/2018 | Lim | G02F 1/133308 |
| 2020/0133431 | A1* | 4/2020 | Allore | G06F 3/03547 |
| 2022/0131540 | A1* | 4/2022 | Veskovic | H05B 47/1975 |

FOREIGN PATENT DOCUMENTS

| CN | 205986814 U | 2/2017 |
| CN | 210781620 U | 6/2020 |
| CN | 212750670 U | 3/2021 |

* cited by examiner

*Primary Examiner* — Renan Luque
(74) *Attorney, Agent, or Firm* — SALIWANCHIK, LLOYD & EISENSCHENK

(57) ABSTRACT

The invention relates to a field of electric equipment, in particular, to an electric light switch, namely, to a touch light switch to be mounted in a wall of a building.

The set of essential features of the present solution enables to achieve such a technical effect as increase of convenience mainly increase of the light weight, the light switching on/off process due to provision of the large area of the touch area on the touch printed circuit board, thus, a high sensitivity on the touch display panel is achieved, i.e., along the entire front area of the device; simplification of mounting of the switch in buildings having old wiring and increase of safety of the device structure. This design of the touch light switch affects the correct operation of the device, thereby enhancing the receipt of signals and decreasing the probability of incorrect commutation of the switch and its failure during mounting.

14 Claims, 9 Drawing Sheets

TOUCH LIGHT SWITCH

CROSS-REFERENCE TO RELATED APPLICATION

This application claims priority to Ukrainian Application No. a 2023 01117, filed Mar. 17, 2023, which is hereby incorporated by reference in its entirety.

FIELD OF THE INVENTION

The invention relates to a field of electric equipment, in particular, to an electric light switch, namely, to a touch light switch to be mounted in a wall of a building.

PRIOR ART

Home automation systems (by means of electricity, illumination, shading, access control, security systems and other interrelated systems of a building) being so-called multi-functional systems "Smart home" which provide home comfort and safety are getting more and more popular every year.

Illumination is one of key components of the "Smart home" system. A so-called "smart" illumination allows to save power consumption and to create favorable conditions.

When mounting the "Smart home" system, users very often face a problem of combining new "smart" illumination devices, e.g., touch light switches, in buildings with old-fashioned power supply systems, e.g., with old wiring systems.

Prior art teaches a wide range of touch light switches, and the applicant has selected several technical solutions among them, which are the closest to the proposed invention in terms of a set of essential features.

Patent CN205986814U dated Feb. 22, 2017 teaches a touch light switch comprising a panel, a frame that is secured on the panel and a base that is connected to said panel. The base and the panel constitute a shell of the touch switch on a wall. The switch further comprises a power drive circuit board, a touch pad, a control circuit board. The power drive circuit board is connected to the panel, the touch pad and the circuit board are arranged inside the frame and electrically interconnected, wherein the control circuit board is connected to the panel, while the power drive circuit board is arranged in the base. A drawback of the proposed technical solution lies in very small dimensions of a touch area and the user has to make an effort to find a specific touch area on the touch pad for "pressing". Besides, it is not clear whether the switch can work from 220 V without a central, i.e., a process of mounting the switch in buildings with old wiring is complicated.

Also, the prior art teaches patent CN212750670U dated Mar. 19, 2021 that discloses a touch switch that consists of a panel, a control circuit board, a lower part of a shell and a dust-proof rubber pad, while a front surface of the panel is provided with an integrated touch console-type button, a rear surface of the integrated touch console-type button is provided with a convex contact point, a rear part of the panel is provided with a mounting stand, the control circuit board is provided with a mounting opening that corresponds to the mounting stand, a light switch point corresponds to a position of the convex contact point at a rear side of the integrated touch console-type button, the control circuit board is fixed on the mounting stand on the rear surface of the panel via the mounting opening of the control circuit board, the dust-proof rubber pad is arranged between the panel and the control circuit board, and the rear part of the panel is equipped with a bolt that is inserted into a joint groove of the lower part of the shell. A drawback of the proposed technical solution also lies in very small dimensions of a touch area and the user has to make an effort to find a specific touch area on the touch pad for "pressing". The device structure does not allow the switch to work from 220 V without a central, thereby complicating a process of mounting the switch in buildings with old wiring.

CN210781620U dated Jun. 16, 2020 is taken as the closest analogue of the present invention and it teaches a touch light switch comprising a first assembly and a second assembly detachably installed on the first assembly, and the first assembly comprises a shell, a power supply printed circuit board assembly and a control printed circuit board assembly which are arranged in the shell, the second assembly comprises a touch display panel and a touch printed circuit board assembly connected to the touch display panel, the touch control printed circuit board assembly is electrically connected to the control printed circuit board assembly, the control printed circuit board assembly is electrically connected to the power supply printed circuit board assembly, the touch control printed circuit board assembly comprises a touch area and an indication assembly, the touch display panel is provided with a display assembly corresponding to the indication assembly, and the indication assembly is set to indicate a corresponding adjustment of an illumination load through triggering of the touch area, and an indication of the indication assembly is displayed through the display assembly. A drawback of the proposed technical solution lies in a complex structure of the touch area. The device structure does not allow the switch to work from 220 V without a neutral. The switch structure is not complex, but in view of a lack of two converters (for passive and active states of relay contacts), it is not allowed to reduce an overall consumption current which, in turn, inhibits an unwanted supply of a load in the passive (disabled) state of the relay.

SUMMARY OF THE INVENTION

An objective underlying the invention is to provide a touch light switch in which an increased touch area on a touch printed circuit board would be provided, working of the device from 220 V without a neutral would be enabled, a probability of touching to conductive energized parts of the device would be decreased, an antenna arrangement would be enhanced, in particular, into "external" elements of the device structure which reside beyond a mounting site, e.g., beyond a wall of a building, and a commutation of the switch would be simplified.

Said objective is achieved by providing a touch light switch comprising a first assembly and a second assembly that is detachably mounted on the first assembly, and the first assembly comprises a shell, a power supply printed circuit board assembly and a control printed circuit board assembly which are arranged in the shell. The shell consists of a base and a mounting pad, and the power supply printed circuit board assembly comprises a voltage converters unit having two converters. The second assembly comprises a touch display panel and a touch printed circuit board assembly that is connected to the touch display panel and that is electrically connected to the control printed circuit board assembly that is, in turn, electrically connected to the power supply printed circuit board assembly. The touch printed circuit board assembly comprises a touch area. According to the invention, the second assembly is detachably mounted on the first assembly by means of a frame that is attached along a circumference of the mounting pad of the shell. The mounting pad is provided with receiving recesses, and the frame comprises attachment tools for fixing to the touch display panel that is configured to be divided into touch areas formed as separate buttons. The power supply printed circuit board assembly comprises a power supply commutation relay unit that is configured to change a number and a type of channels, a power supply connection terminals unit, an energy accumulation unit having a main energy accumulation module and an additional energy accumulation module, a voltage stabilizer, a fuse, a current shunt, a differential amplifier, a transistor, wherein the voltage converters unit is provided with two converters for a passive state and for an active state of the relay contacts respectively, where the relay passive state converter is made as a low-power impulse converter having a designed transformer and a feedback assembly. The power supply printed circuit board assembly is connected, by means of connectors, to the control printed circuit board assembly that comprises a microcontroller unit having an embedded radio module, a balancing device unit, an anti-electrostatic interferences unit, a memory unit, a touch display panel areas adjustment unit and an illumination and indication LEDs unit, as well as areas for providing an electrical connection to the touch printed circuit board assembly, and recesses are provided along a circumference of the control printed circuit board. The base of the shell is covered with a flat cap having protrusions provided along its circumference, and the protrusions have hooks for fixing the cap on an inner surface of the base so as to enable clamping of the power supply printed circuit board and the control printed circuit board, and protruding lenses for the LEDs and openings are provided in a central part of the cap. The second assembly further comprises a light guide having recesses, attachment tools for attaching to the frame and openings. The touch printed circuit board assembly that is arranged between the light guide and the touch display panel comprises openings, antenna pogo pins and touch area electrodes pogo pins unit, and the antenna is made as a track on the touch printed circuit board, while the touch area is made at the entire area of the touch printed circuit board, where at least two electrodes pogo pins of the touch area are arranged in the central part of the touch printed circuit board, while at least two antenna pogo pins are arranged on a diagonal of the touch printed circuit board, and said pogo pins come in a contact with corresponding areas of the control printed circuit board assembly via the corresponding openings provided in the light guide and in the cap. The touch display panel comprises attachment tools for attaching to the frame and attachment tools for attaching to the mounting pad which pass through said openings provided in the touch printed circuit board assembly and in the light guide, and are fixed in the receiving recesses.

In order to decrease a probability of touching to the conductive energized parts of the device, the inventor has conducted tests of the structure of the switch. The prior art discloses that the switch can be divided into two assemblies being so-called "internal" and "external" assemblies, where the internal assembly is arranged in a mounting location, e.g., in a wall of a building or a flat, while the external assembly is attached on the internal assembly, and a user directly contacts the external assembly when switching on/off the light. During mounting and then during further usage, it is possible that the user will touch the conductive elements. Therefore, in order to achieve a safe structure of the switch, the inventor has been working on connections between the elements in the structure, their arrangement, attachments to each other, as well as materials for making the elements of the switch. Besides, this division into assemblies enables a convenient mounting of the device as compared to the common light switch.

According to the invention, the second assembly, i.e., the so-called "external" assembly, is detachably mounted on the first assembly (i.e., the so-called "internal" assembly) by means of the frame that is attached by means of grooves and protrusions along the circumference of the mounting pad of the shell. Besides, the frame comprises attachment tools for attaching to the touch display panel. Therefore, the frame allows a reliable mounting of one assembly on another one without any need in using attachment elements between the assemblies which may become dangerous during passage of the current. The frame is semi-transparent and light-diffusing in order to provide more uniform illumination during the switch operation in order to identify its arrangement.

In order to further enhance the reliability of arrangement of the second assembly on the first assembly, the mounting pad is provided with the receiving recesses which the corresponding attachment tools come into and where they are fixed. In the description of the invention provided hereinafter, all interrelations of the attachment tools according to their arrangement on the elements of the switch structure will be disclosed.

According to the invention, the power supply printed circuit board assembly comprises a power supply commutation relay unit that is configured to change a number and a type of channels, a power supply connection terminals unit, energy accumulation unit having a main energy accumulation module and an additional energy accumulation module, a voltage stabilizer, a fuse, a current shunt, a differential amplifier, a transistor, wherein the voltage converters unit is provided with two converters for a passive state and for an active state of the relay contacts respectively, where the relay passive state converter is made as a low-power impulse converter having a designed transformer and a feedback assembly.

In order to provide convenient and easy usage of the switch in different options of its arrangement and embodiments, the power supply commutation relay unit is configured to change a number and a type of the channels. For example, if the switch is a one-button switch and controls one illumination circuit, then the power supply commutation relay unit comprises one relay (according to one of embodiments of the device). If the switch is a two-button switch and controls two illumination circuits, then the power supply commutation relay unit may comprise two relays (according to another embodiment of the device). If it is required to use two switches to control one illumination circuit, e.g., in upper and lower parts of stairs in order the user could switch on and switch off the light in both locations, the power supply commutation relay unit may comprise one change-over type relay (according to another embodiment of the device). At the same time, according to one of embodiments of the device, the relay is provided with a flap, thereby positively affecting the overall low current consumption which is important for this type of the switch.

It is known that existing switches utilize voltage converters. Supply current of the device (i.e., the switch) may be distributed depending on a current load state: load enabled and load disabled. In order to achieve an efficient operation of the device from 220 V without a neutral, the inventor, upon conduction of numerous tests, has found that the use of two converters in the voltage converter unit for the passive state (disabled load) and for the active state (enabled load) of the relay contacts respectively is optimal and provides the operation of the switch at enabled and disabled load (e.g., a lamp) respectively, however, by making the converter as a low-power impulse converter having a designed transformer and a feedback assembly, it is allowed to decrease the consumption current which, in turn, decreases the probability of powering of certain loads such as low-power LED lamps. The inventor has found that the energy accumulation unit is important component of the general electrical communication scheme of the switch for providing the efficient operation of the device from 220 V without a neutral. According to the invention, the energy accumulation unit is provided with a main energy accumulation module and an additional energy accumulation module. Two voltage converters operate for one main energy accumulation module, and the voltage from the module further comes to the voltage stabilizer that forms a required stable voltage for powering the microcontroller having the embedded radio module, the indication LEDs and the touch display panel. Also, the energy is accumulated in the additional energy accumulation module after the voltage stabilizer. According to one of embodiments, both modules comprise a high-capacity electrolytic capacitor for switching between coils of the relay with the flap which requires short high-energy impulses to switch them. This design of the modules on common electrolytic capacitors is beneficial both economically and technically. The additional energy accumulation module enables to decrease unwanted effects of surges of the general consumption current consumed by the electric communication circuit of the device.

Besides, the switch is provided with a differential amplifier to protect the device against overload. Particularly, the differential amplifier enables to increase the difference of voltages against the background of a significant in-phase component.

According to the invention, the power supply printed circuit board assembly is connected, by means of connectors, to the control printed circuit board assembly that comprises a microcontroller unit having an embedded radio module, a balancing device unit, an anti-electrostatic interferences unit, a memory unit, a touch display panel areas adjustment unit and an illumination and indication LEDs unit, as well as areas for providing an electrical connection to the touch printed circuit board assembly, and recesses are provided along a circumference of the control printed circuit board.

In order to simplify the inventive structure, to provide easy and quick operation of the switch, the microcontroller is made already with the embedded radio module. The balancing device unit enables to coordinate the antenna and radio module operation in the microcontroller. The anti-electrostatic interferences unit enables to protect the device electronics against electrostatic interferences. The memory unit is configured to enable software updates if necessary, while a content of the memory unit may be removed or reprogrammed. The touch display panel areas adjustment unit enables to provide a configuration of buttons, if the touch display panel is made as a single button or as two buttons or in other forms. The illumination and indication LEDs unit enables the operation of the LEDs of a "night" illumination and a system indication of the switch. In order to enable electric connection of the control printed circuit board to the touch printed circuit board, the control printed circuit board is provided with corresponding areas.

As mentioned above, by conduction of numerous tests, the inventor has found that it is necessary to provide easy and reliable attachment of the elements of the switch structure without using any additional attachment elements and with a protection against touching the conductive energized parts of the device. The recesses which act as the attachment tool are provided at the circumference of the control printed circuit board, and the attachment tools of the light guide together with the protrusions of the frame itself pass to these recesses. In this way, the second assembly is reliably fixed on the first assembly due to the multi-variant design of the attachment tools in the elements of the switch structure.

The base of the switch shell is covered with a flat cap having protrusions provided along its circumference, and the protrusions have hooks for fixing the cap on an inner surface of the base so as to enable clamping of the power supply printed circuit board and the control printed circuit board. In this way, the elements of the first assembly of the switch are reliably fixed in the device structure without using any additional attachment elements. Protruding lenses for the LEDs and openings are provided in the central part of the cap. The openings are provided for passing the pogo pins from the elements of the structure of the second assembly. The lenses for the LEDs operate to diffuse. Also, the flat cap is made semi-transparent in order to provide a correct light diffusion from the indication LEDs during the "night" illumination and it operates to isolate the energized parts if the second assembly of the switch is absent (e.g., removal during mounting). According to the invention, the second assembly comprises the touch display panel and the touch printed circuit board assembly connected thereto, as well as the light guide having the recesses, the attachment tools for attaching to the frame and the openings. The light guide is made transparent to transmit the light from the illumination/indication LEDs to the frame. The openings of the light guide are provided to enable passage of the attachment tools of the touch display panel to the mounting pad and their mounting in the receiving recesses. Therefore, owing to this design of the light guide, it is reliably fixed at its arrangement location without any possible "moving out" from its location or incorrect mounting in the switch.

The touch printed circuit board assembly that is arranged between the light guide and the touch display panel comprises openings, antenna pogo pins and touch area electrode unit, and the antenna is made as a track on the touch printed circuit board, while the touch area is made at the entire area of the touch printed circuit board, where at least two pogo pins of the electrodes of the touch area are arranged in the central part of the touch printed circuit board, while at least two pogo pins of the antenna are arranged on a diagonal of the touch printed circuit board, and said pogo pins come in a contact with the corresponding areas of the control printed circuit board assembly via the corresponding openings provided in the light guide and in the cap. In this case, the openings of the touch printed circuit board are also provided to enable passage of the attachment tools of the touch display panel to the mounting pad and their mounting in the receiving recesses.

As mentioned above, the objective of the inventors was to increase the touch area on the touch printed circuit board in order to make the entire area of the touch display panel of the switch touchable instead of the small area as provided in most of the analogues of this type of switches which will provide ease of use of the switches merely by pressing the touch display panel with a finger or by waving a hand near the touch display panel. In order to achieve this objective, the pogo pins unit is provided on the touch printed circuit board, and this unit is divided into the antenna pogo pins and the touch area electrode pogo pins. At least two antenna pogo pins are arranged on the diagonal of the touch printed circuit board in order to enable symmetrical mounting of the circuit board without any need to search for a correct spatial position. At least touch area electrode pogo pins are arranged in the central part of the touch printed circuit board, and the antenna is made in the form of the track on the touch printed circuit board, thereby forming the touch area on the entire area of the touch printed circuit board. Said pogo pins come into contact with the corresponding area of the control printed circuit board assembly via the corresponding openings of the light guide and cap, thereby providing the reliable and easy commutation of the device.

The arrangement of the antenna on the touch printed circuit board, i.e., in the "external" part of the switch, provides enhanced receipt of signals as compared to the analogues, where antennas are hidden in that part of the switch which is arranged inside a wall recess. Also, the device commutation is simplified due to use of the pogo pins which provide the connection of the touch display panel to the main part of the switch with the power supply and control printed circuit boards. Therefore, the probability of incorrect commutation and the probability of failure of the switch during mounting are decreased.

Currently, no switches which could have a completely sensitive front surface and which could work from 220 V without a neutral are known among the existing analogues.

According to one of embodiments, the touch printed circuit board is made in white color in order to provide better reflection of the light from the illumination/indication LEDs.

According to the invention, the touch display panel is configured to be divided into touch areas formed as separate buttons. According to one of embodiments of the switch, the touch display panel is made as a single button. According to another embodiment of the switch, the touch display panel is made as two buttons which are visually separated by the semi-transparent separating light guide that is fixed on the touch display panel. In order to provide reliability, the semi-transparent separating light guide is welded to the touch display panel. Therewith, the semi-transparent separating light guide, while passing via the touch printed circuit board, is arranged in a white insert that is, in turn, inserted into the light guide. The white insert blocks any fogging caused by adjacent buttons.

As mentioned above, in order to provide the reliable attachment of all the elements of the device structure, the touch display panel comprises attachment tools for attaching to the frame and attachment tools for attaching to the mounting pad which pass through said openings provided in the touch printed circuit board assembly and in the light guide, and are fixed in the receiving recesses. Therewith, the attachment tools for attaching to the mounting pad are made as four struts which pass through the openings of other elements of the structure and rigidly fixed in the receiving recesses of the mounting pad. In this way, the reliable fixation relationship between all the elements of the switch is provided starting from the "front" area and ending with the "rear" part of the device.

According to embodiment of the device, the shell is made of white colored LUPOY GN2106FD polycarbonate, and the polycarbonate provides reliability of the material which the switch is made of, the optimal weight, optical parameters, flexibility and impact resistance, while the white color provides better reflection of the light. The rest of elements of the structure, except for the shell, are made of LUPOY EF1006F polycarbonate which provides light weight and the appropriate flexibility of the elements of the structure.

Owing to this general structure of the device, several mentioned switches may be tightly arranged one adjacent to another one and inserted into a certain general frame. That is, a kind of serial insertion into the general frame on several switches (e.g., from one to eight) is enabled. Therefore, when replacing old switches with new touch switches, it will not be required to enlarge the openings in the wall and to mount single switches which would be inconvenient.

The set of essential features of the present solution enables to achieve such a technical effect as increase of convenience mainly increase of the light weight, the light switching on/off process due to provision of the large area of the touch area on the touch printed circuit board, thus, a high sensitivity on the touch display panel is achieved, i.e., along the entire front area of the device; simplification of mounting of the switch in buildings having old wiring and increase of safety of the device structure. This structure of the touch light switch affects the correct operation of the device, thereby enhancing the receipt of signals and decreasing the probability of incorrect commutation of the switch and its failure during mounting.

BRIEF DESCRIPTION OF THE DRAWINGS

In order to provide more complete understanding of the claimed invention and advantages thereof, the following description provides an explanation of possible exemplary embodiments thereof with a reference to figures of the appended drawings, wherein identical designations denote identical parts, and which illustrate the following:

Figure 1:
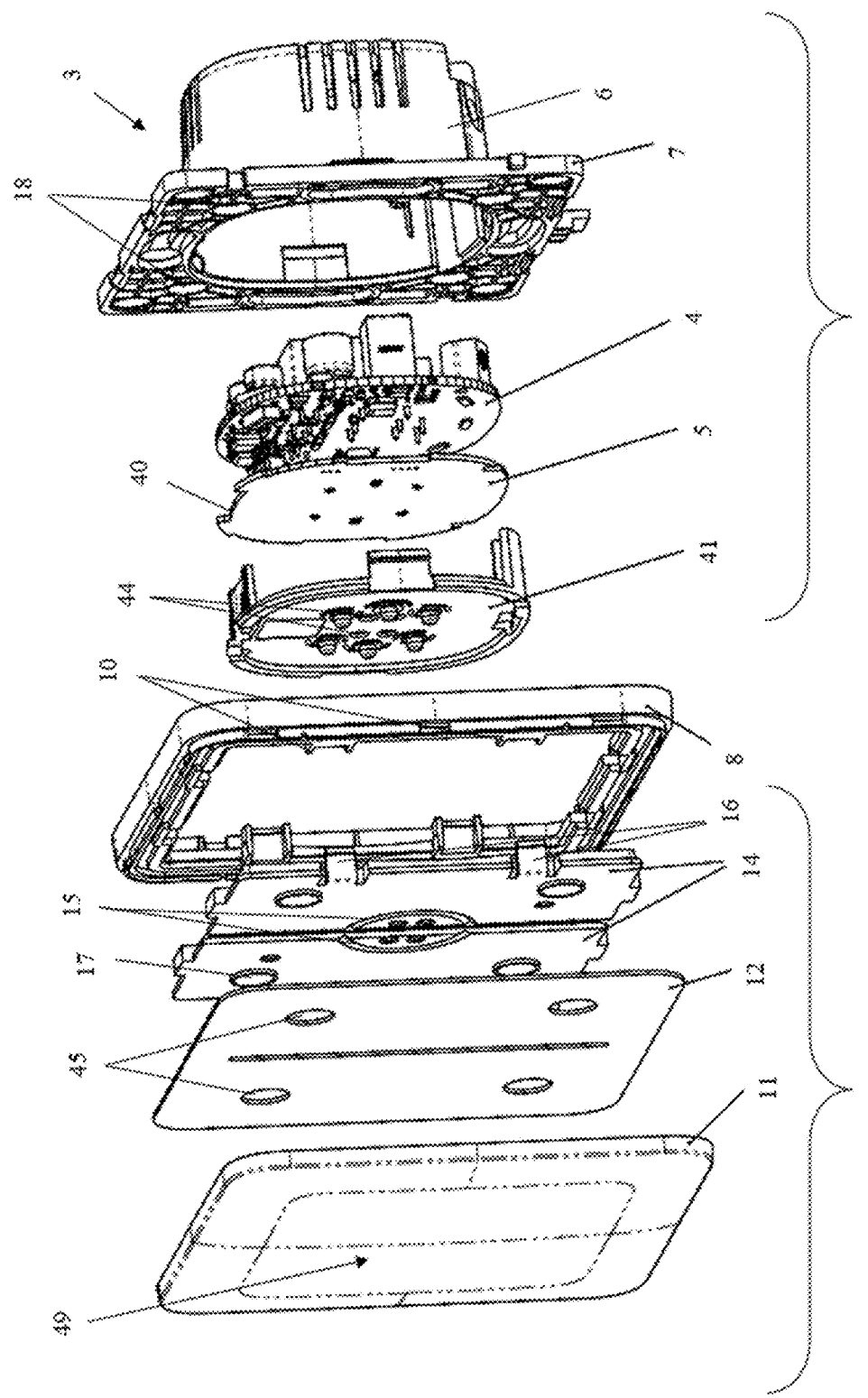
FIG. 1 illustrates an exploded view of the elements of the touch switch in one of embodiments, where the touch display panel is made as a single button.
Figure 2:
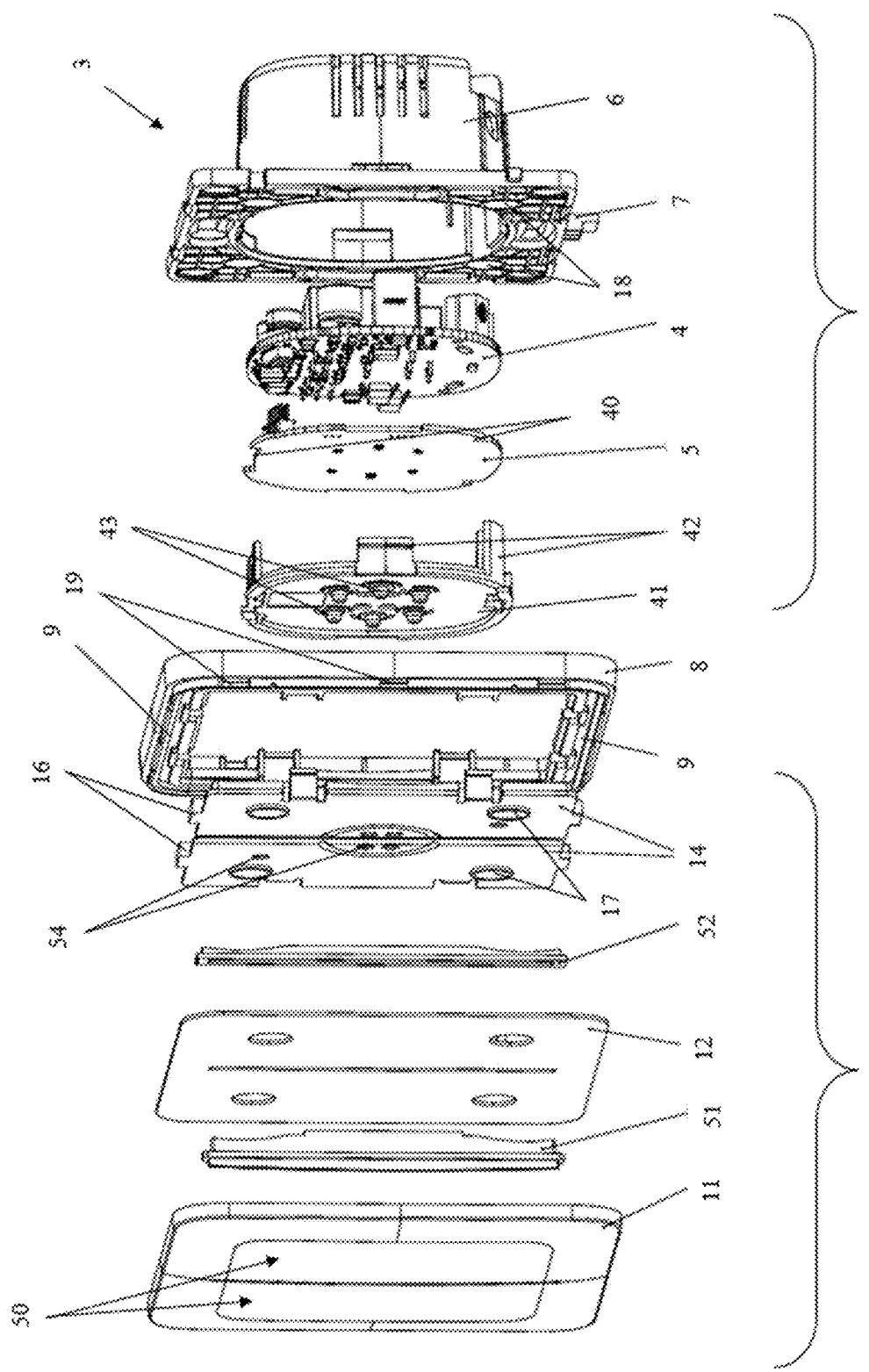
FIG. 2 illustrates an exploded view of the elements of the touch switch in another embodiment, where the touch display panel is made as two buttons.
Figure 3:
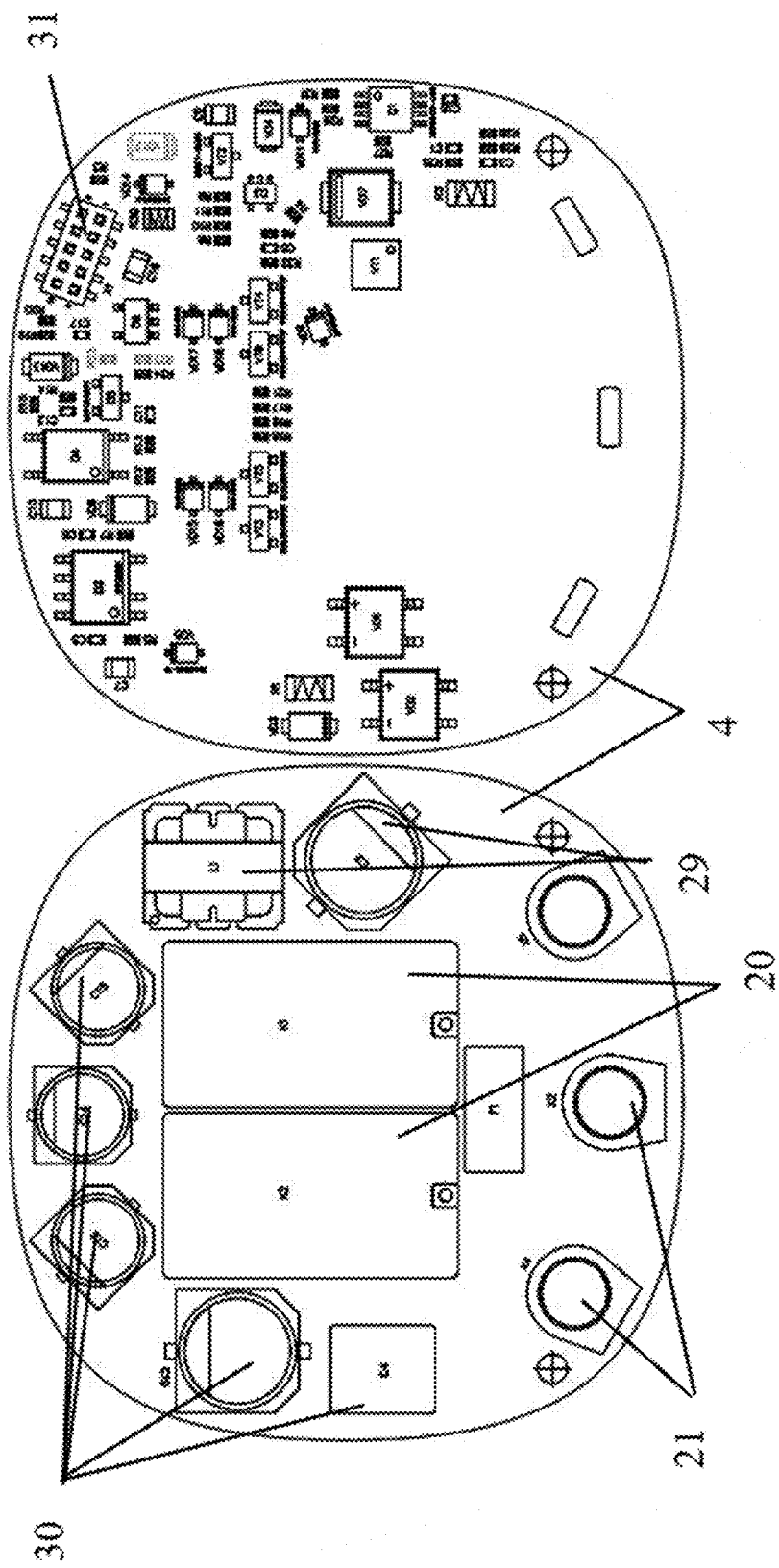
FIG. 3 illustrates a view of the power supply printed circuit board from both sides.
Figure 4:
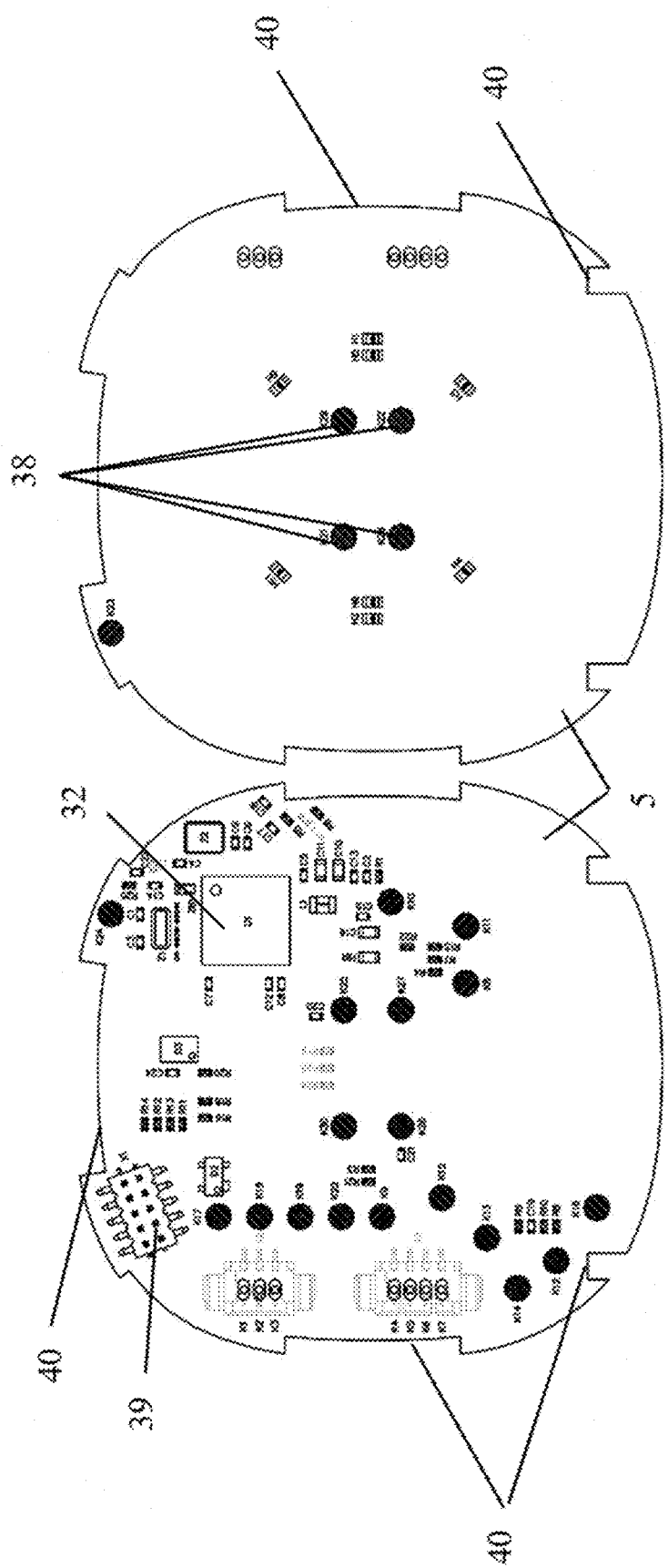
FIG. 4 illustrates a view of the control printed circuit board from both sides.
Figure 5:
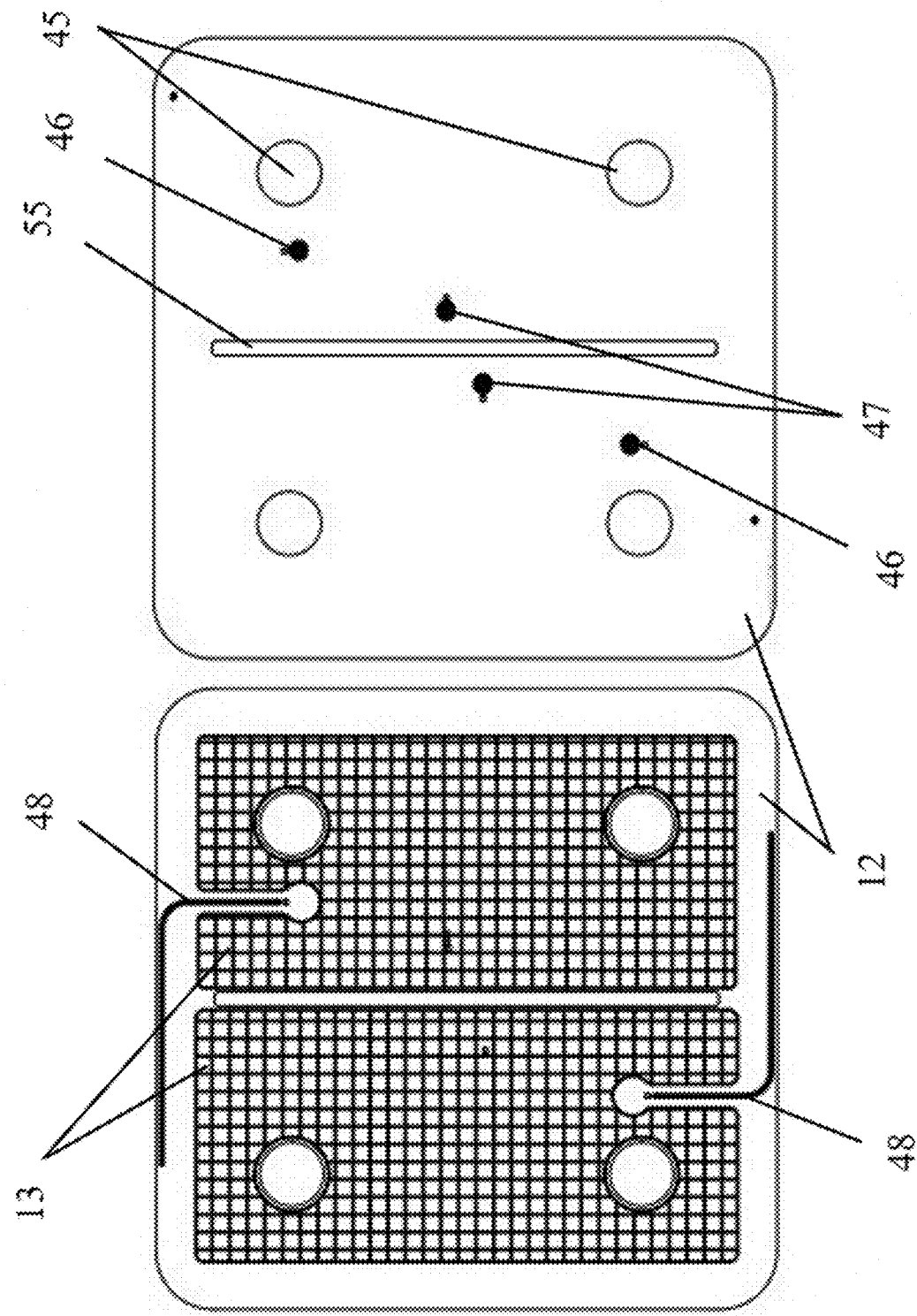
FIG. 5 illustrates a view of the touch printed circuit board from both sides.

MAIN DESIGNATIONS 1. first assembly,
2. second assembly,
3. shell,
4. power supply printed circuit board,
5. control printed circuit board,
6. base,
7. mounting pad,
8. frame,
9. grooves of the frame,
10. protrusions of the frame,
11 touch display panel,
12. touch printed circuit board,
13. touch area,
14. light guide,
15. recesses of the light guide,
16. protrusions of the light guide,
17. openings of the light guide,
18. receiving recesses, 19. grooves of the frame for attaching the touch display panel,
20. power supply commutation relay,
21. power supply connection terminals,
22. main energy accumulation unit,
23. additional energy accumulation unit,
24. voltage stabilizer,
25. fuse,
26. current shunt,
27. differential amplifier,
28. transistor,
29. converter for the passive state of the relay contacts,
30. converter for the active state of the relay contacts,
31. connectors for connecting the power supply printed circuit board to the control printed circuit board,
32. microcontroller having the embedded radio module,
33. balancing device,
34. anti-electrostatic interferences unit,
35. flash memory,
36. touch display panel areas adjustment unit,
37. illumination and indication LEDs,
38. areas for providing the electrical connection to the touch printed circuit board,
39. connectors for connecting to the power supply printed circuit board,
40. recesses of the control printed circuit board,
41. flat cap,
42. protrusions with hooks,
43. lenses for the LEDs,
44. openings of the flat cap,
45. openings of the touch printed circuit board,
46. two antenna pogo pins,
47. two touch area electrode pogo pins,
48. antenna,
49. single button of the touch display panel,
50. two buttons of the touch display panel,
51. separating light guide,
52. insert for the separating light guide,
53. transformer,
54. openings of the light guide for the pogo pins,
55. opening for passage of the separating light guide.

Figures that illustrate the invention claimed and the disclosed specific exemplary embodiments do not limit the scope of claims in any way, rather they only explain the essence of the invention.

Implementation of the Invention

An illustrative embodiment of the invention is described hereinafter in detail using said figures. Implementations, which are disclosed in the following description of the embodiment, do not encompass all implementations of the invention, rather they serve solely to provide an additional explanation of the essence thereof.

A touch light switch comprises a first assembly (1) and a second assembly (2) which is detachably mounted on the first assembly (1). The first assembly (1) comprises a shell (3), a power supply printed circuit board (4) and a control printed circuit board (5) which are arranged in the shell (3). The shell (3) consists of a base (6) and a mounting pad (7), and in this embodiment, the shell is made of a white-colored LUPOY GN2106FD polycarbonate.

The detachable mounting of the second assembly (2) on the first assembly (1) is provided by means of a light-diffusing frame (8) that is attached by means of grooves (9) and protrusions (10) along a circumference of the mounting pad (7) of the shell (3).

The second assembly (2) comprises a touch display panel (11) and a touch printed circuit board (12) connected thereto, and a touch area (13) is provided on the touch printed circuit board. The second assembly (2) further comprises a light guide (14) having recesses (15), attachment tools for attaching to the frame which are made as eight protrusions (16), and four openings (17).

Receiving recesses (18) are provided on the mounting pad (7). The frame (8) further comprises attachment tools for attaching to the touch display panel (11) which are made as grooves (19).

The power supply printed circuit board (4) comprises a power supply commutation relay (20), and its number and type may vary. For example, in one embodiment, the relay (20) is made as a single relay, while in a further embodiment, it is made as two relays (20), and in another embodiment, it is made as a change-over type relay (20). This allows to make the switch both as a one-button switch and as a two-buttons switch, as well as to control one or two illumination circuits, or to control one illumination circuit by two switches. In this embodiment of the device, the relay (20) is provided with a flap.

Also, the power supply printed circuit board (4) comprises three power supply connection terminals (21), a main energy accumulation unit (22) and an additional energy accumulation unit (23), a voltage stabilizer (24), a fuse (25), a current shunt (26), a differential amplifier (27) and a transistor (28). Both energy accumulation modules (22, 23) comprise an electrical capacitor. In one of embodiments of the switch, said two modules (22, 23) comprise accumulated energy voltage level control (measurement) circuits. These signals are received by a microcontroller (32) and used for correct and effective use when switching the scheme to various modes (enabled and disabled load) as well as to provide a correct commutation of the relay (20).

The power supply printed circuit board (4) is provided with two converters for a passive (29) and an active (30) states of the relay contacts respectively. The converter (29) for the passive state of the relay is made as a low-power impulse converter having a designed transformer (53) and a feedback assembly. In one of embodiments of the switch, the converter (29) for the passive state of the relay is built on the chip Highly Energy Efficient Off-line Switcher IC and has the Flyback topology. Also, the transformer (53) for this converter (29) is designed specifically for parameters of this switch which are required to provide power supply to the assemblies of the electrical circuit of the device. Besides, the electrical circuit of the converter (29) comprises the feedback assembly which is built on an optocoupler.

The power supply printed circuit board (4) is connected to the control printed circuit board (5) by means of connectors (31). The control printed circuit board comprises a microcontroller (32) having an embedded radio module, a balancing device (33), an anti-electrostatic interferences unit (34), a memory unit that is made as a flash memory (35), a touch display panel areas adjustment unit (36) for forming soldering cards of different versions of the device, illumination and indication LEDs (37), as well as areas (38) for providing an electrical connection to the touch printed circuit board (12) and connectors (39) for connection to the power supply printed circuit board (4).

The base (6) of the shell (3) is covered with a flat cap (41) having protrusions (42) provided along its circumference, and the protrusions have hooks for fixing the cap (41) on an inner surface of the base (6), thereby clamping the power supply printed circuit board (4) and the control printed circuit board (5) in the shell (3). Six protruding lenses (43) for the LEDs and four openings (44) are provided in the central part of the cap (41).

Five recesses (40) are provided along the circumference of the control printed circuit board (5), while the protrusions (42) of the cap (41), the protrusions of the frame (10) and the protrusions of the light guide (16) pass through the recesses in order to provide reliability of fixation of the elements of the switch between each other.

The touch printed circuit board (12) is arranged between the light guide (14) and the touch display panel (11), comprises openings (45), two antenna pogo pins (46) and two touch area electrode pogo pins (47). The antenna (48) is made as a track, and the electrodes are made of copper. The touch area (13) is provided on the entire area of the touch printed circuit board (12), where the electrode pogo pins (47) of the touch area (13) are arranged in the central part of the touch printed circuit board (12), while the antenna pogo pins (46) are arranged on the diagonal of the touch printed circuit board (12). In this embodiment, the pogo pins are spring-loaded gold-plated contacts.

Said pogo pins come into contact with the corresponding areas (38) of the control printed circuit board (5) through the corresponding openings (17) of the light guide and through the openings (44) of the cap (41).

The touch display panel (11) is configured to be divided into touch areas formed as separate buttons. In one of embodiments, the touch display panel (11) is made as a single button (49). In another embodiment of the switch, the touch display panel (11) is made as two buttons (50) which are visually separated by a semi-transparent separating light guide (51) that is welded to the touch display panel (11). The semi-transparent separating light guide (51), while passing through an opening (55) of the touch printed circuit board (12), is arranged in a white insert (52) that is, in turn, inserted into the light guide (14).

If the touch display panel (11) is made as a single button, the touch area (13) is made as a single area, while if the touch display panel (11) is made as two buttons, the touch area (13) is divided into two areas which are assigned to two buttons separately.

The light guide (14) comprises six openings (54) to provide passage of the pogo pins from the touch printed circuit board (12).

The touch display panel (11) comprises attachment tools for attaching to the frame (8) and attachment tools for attaching to the mounting pad (7) which pass through said openings (45) provided in the touch printed circuit board (12) and the openings (17) provided in the light guide (14), and are fixed in the receiving recesses (18). The attachment tools (8) for attaching to the frame are made as protrusions (not shown in the figures) which penetrate into the corresponding grooves (9) of the frame, and the attachment tools for attaching to the mounting pad (7) are made as four struts which pass through the above-mentioned openings of other elements of the structure and rigidly fixed in the receiving recesses (18) of the mounting pad (7).

The rest of the elements of the switch structure, except for the shell (3), are made of LUPOY EF1006F polycarbonate. The flat cap (14) and the frame (8) are semi-transparent, the light guide (14) is transparent, and the touch printed circuit board (12) is white-colored. The touch display panel (11) may have any color depending on a surrounding landscape.

Description of the Switch Operation

Some explanations as to FIGS. 6-9 are stated hereinafter:

SPI (Serial Peripheral Interface, SPI bus) is a serial synchronous data transmission standard in full duplex mode that is intended to provide simple and cost-effective high-speed communication between microcontrollers and periphery.

GPIO (General-purpose input/output, GPIO) is an interface for communication between components of a computer system, e.g., between a microprocessor and various peripheral devices. HF is a high-frequency circuit.

V_LNK is a circuit of the main energy accumulation module.

V_COIL is a circuit of the additional energy accumulation module.

V_MCU is a microcontroller circuit.

V_PS_ON voltage is a power supply voltage for the scheme of the active state of the contacts.

V_PS_OOF voltage is a power supply voltage for the scheme of the passive state of the contacts.

Figure 6:
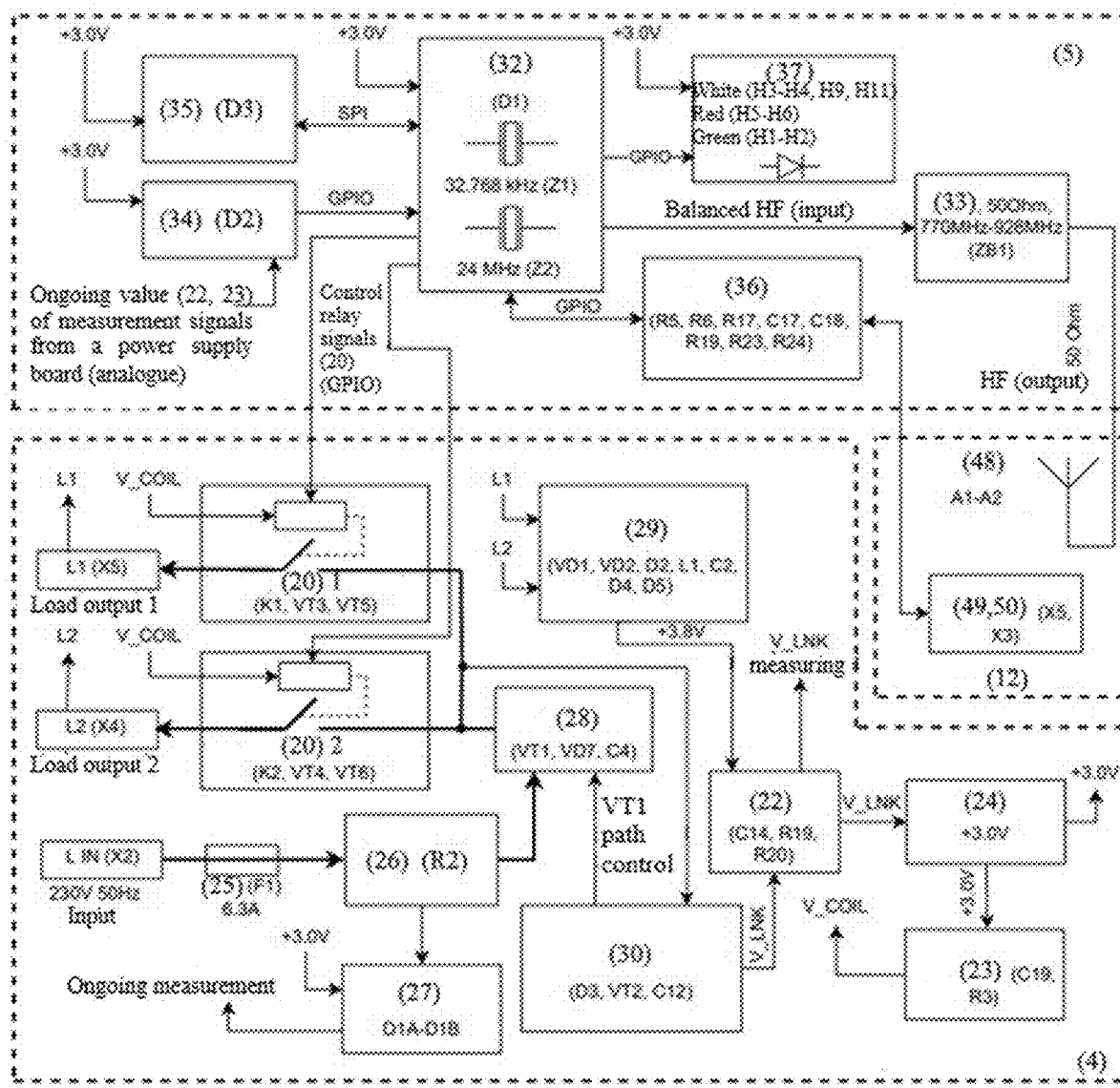
FIG. 6 illustrates a structural block diagram of the switch.
Figure 7:
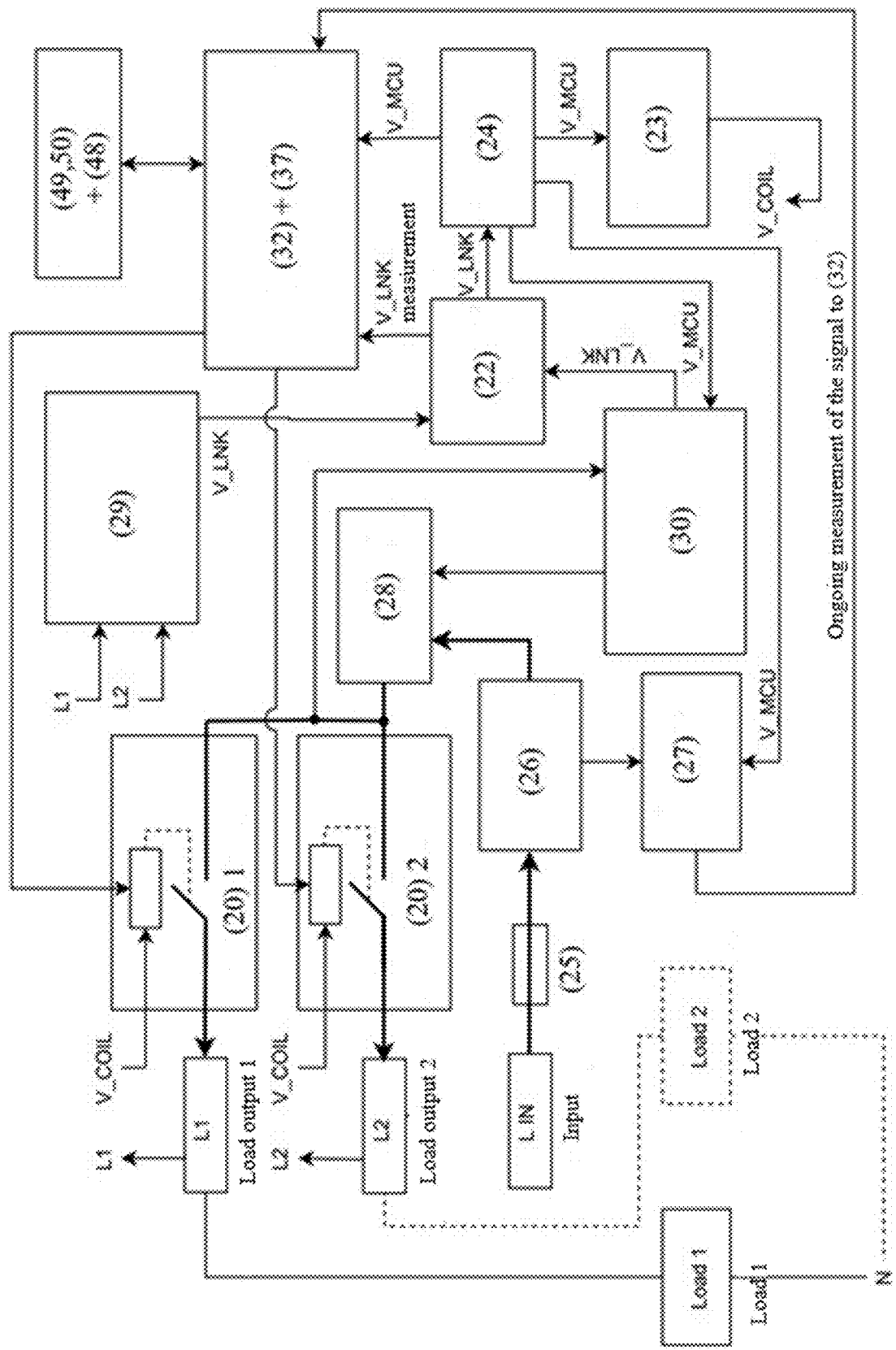
FIG. 7 illustrates a general block diagram of the switch.
Figure 8:
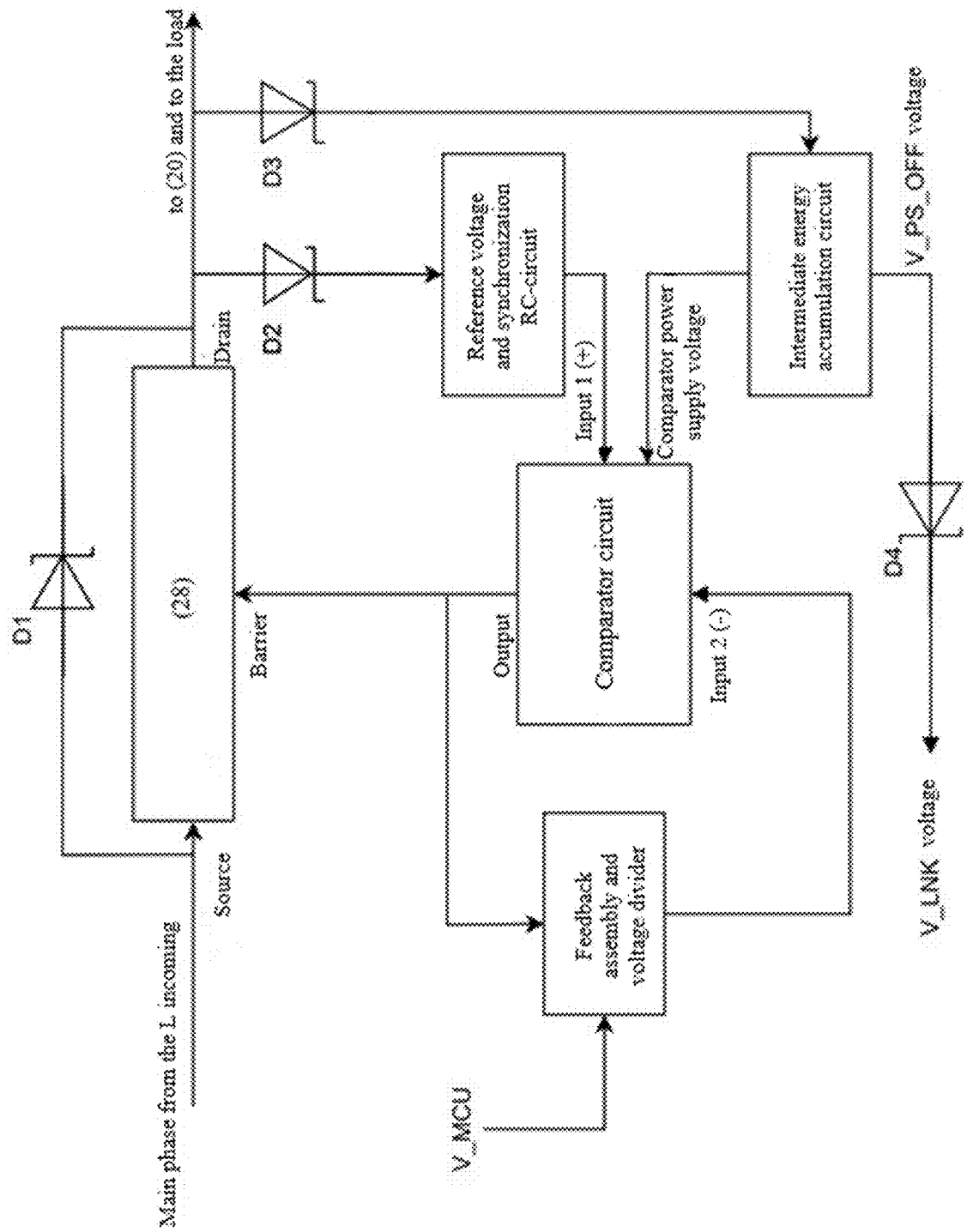
FIG. 8 illustrates a flow chart of the operation of the converter of the active (enabled) state of the relay contacts.
Figure 9:
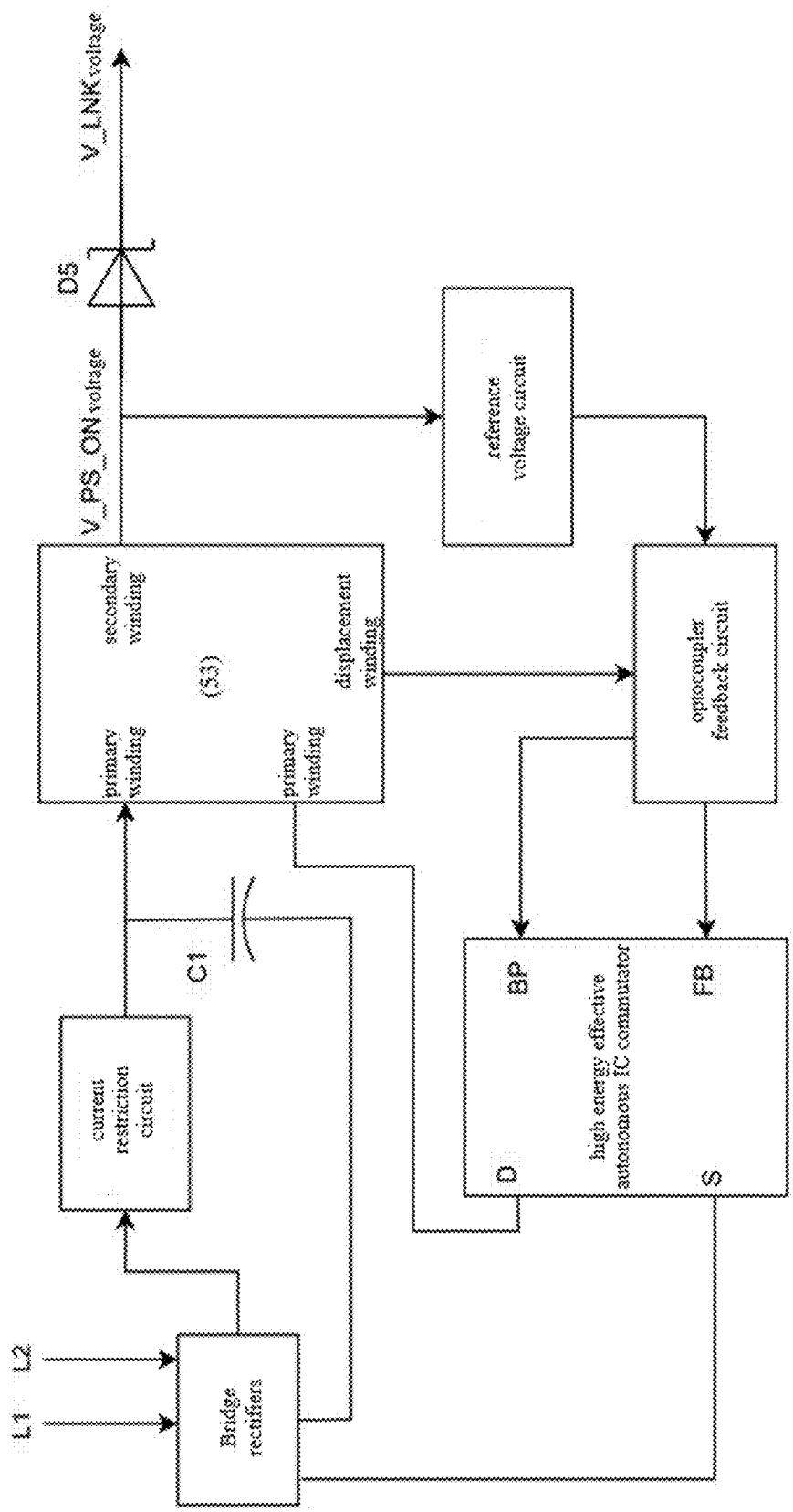
FIG. 9 illustrates a flow chart of the operation of the converter of the passive (disabled) state of the relay contacts.

The operation principle of the switch according to the structural scheme shown in FIG. 6 is described hereinafter.

When the touch button (49, 50) on the touch printed circuit board (12) is "pushed", i.e., when a conductive object (a user's finger or hand) appears in the electrical field of the touch button (49, 50) formed by the microcontroller (32) on a polygon of the touch printed circuit board (12), the capacity of the circuit will be changed and the "pushing" will be recorded.

Then, a control signal is fed via the control printed circuit board (5) to the power supply commutation relay (20), the relay (20) switches its contacts and supplies the current from the power supply terminal (21), via the fuse (25), the current shunt (26), the converter (30) of the active state of the relay contacts and output connectors to the load (e.g., lamps). The current shunt (26) with the differential amplifier (27) are intended to measure the load current in order to provide protection against overload.

Also, the relay (20) control signal may be supplied via a radio channel from a central according to a corresponding protocol. In one of embodiments, this protocol is Jeweller which is a radio communication protocol that ensures a non-interrupted interaction between a hub and security system devices.

The power supply current of the switch is also supplied from the power supply terminal (21) and may be distributed depending on the current state of the load.

Detailed Description of the Operation of the Converter of the Active State of the Relay Contacts Load is enabled. The converter (30) of the active state of the relay contacts operates and controls the transistor (28), "cuts off" about 12 V from a voltage sine wave, rectifies a diode D3, filters an intermediate energy accumulation circuit and supplies to the main energy accumulation module (22). In this state, the full load voltage passes through the switch.

When the relay (20) contacts (FIG. 8) are closed, the current load (Load 1(2)) flows through the transistor (28).

Also, the load current flows through a bypass diode D1 for reducing heating of an internal parasitic diode of the transistor (28). The diode D1 acts as a suppressor for decreasing voltage emissions which arise on a comparator when commutating several types of loads.

The load current is supplied to a drain of the transistor (28) from the input terminal (21) L through the fuse (25) and through a current resistor sensor.

The barrier of the transistor (28) is controlled by the comparator having an input 1 that receives the voltage that is formed by the circuit "Reference voltage and synchronization RC-circuit" that is, in turn, powered by the voltage that is formed by a rectifying diode D2. The RC-circuit is adjusted so as to form impulses having a duration that will be acceptable for the commutation of the transistor (28) in terms of its thermal load and will take in account a frequency of a power supply network and a power level of the connected load.

The diode D3 performs rectification and serves to form the comparator's power supply voltage together with the circuit "Intermediate energy accumulation circuit".

The voltage from the feedback assembly comes to an input 2 of the comparator, and the feedback assembly monitors the output control signal for controlling the barrier of the transistor (28) and forms, along with a voltage divider that is powered by the voltage V_MCU, a reference voltage that causes the entire electrical circuit to operate in a mode of generating control impulses for controlling the barrier of the transistor (28). Also, the feedback assembly forms a required hysteresis for the comparator's operation.

Intermediate accumulation of the energy from the transistor (28) drain via the diode D3 occurs in the circuit "Intermediate energy accumulation circuit" and then via a diode D4 it comes to the main energy accumulation unit (22). Also, the transistor (28) drain is connected to closed contacts of the relay (20) and then via output terminals L1, L2 it is connected to the Load 1(2) which, in turn, close the circuit at a neutral N.

The overall principle of the described converter (30) comes to formation of a power supply voltage 1 due to "cutting off" a certain small part voltage half-wave of the network voltage that comes to the load and its accumulation in order to transmit it to the next circuit of the overall energy accumulation. An amount of this voltage depends on a duration of the impulses which control the transistor (28). The power supply voltage 1 that is higher than the power supply voltage 2 that is formed by another converter (29) of the passive state of the relay contacts is described hereinafter.

Detailed Description of the Operation of the Converter of the Passive State of the Relay Contacts Load is disabled. The converter (29) of the passive state of the relay contacts operates (FIG. 9) and takes power from the terminals L1(X5) or L2(X4) and from L IN (X2), since when the relay (20) contacts are open, a difference of potentials exists between these connectors, and this difference almost equals the value of the power supply voltage of the network 230 V. The converter (29) of the passive state of the relay contacts is a low-current impulse voltage converter according to the Flyback topology. It forms an output voltage of about 3.8 V and supplies it further to the main energy accumulation unit (22).

The main energy accumulation unit (22) accumulates the energy and supplies it to the voltage stabilizer (24) that, in turn, forms the required power +3.0 V for the microcontroller (32), the relay (20), the differential amplifier (27), the LEDs (37) etc.

When the relay (20) contacts are open, the difference of potentials will be present thereon and it will be equal to the network power supply voltage. This voltage may be used to supply the power to the described converter (29) of the passive state of the relay contacts. The current that is available from this converter (29) depends on a resistance of the Load 1(2), so in order to avoid occurrence of a visible glow of, e.g., low-power LED lamps, as a load from the switch operation, measures as to decreasing the consumption current by means of the circuit of the described converter (29) have been taken.

The voltage from the open relay contacts L1, L2 and the neutral N which is available via the Load 1(2) comes to bridge rectifiers, it is rectified and then the rectified voltage, via a current restriction circuit, comes to a high-voltage electrolytic capacitor C1 and to a primary winding of the transformer (53). This winding commutates with a certain frequency by a special energy-efficient Highly Energy Efficient Off-line Switcher IC chip.

In order to maintain the low level of the consumption current consumed by the converter (29), a feedback chip is used on the "Reference voltage circuit" circuit, and on optocouplers which are connected to outputs of the chip FB (feedback) and BP (bypass). Parameters of these circuits are important for preserving the low consumption current consumed by the electric circuit of the converter (29).

Thus, the described circuit is the impulse converter (29) that is built according to the Flyback topology, but has the decreased level of the consumption current.

The output power supply voltage 2 (V_PS_ON voltage) is formed on a secondary winding and it comes, through a diode D5, to the main energy accumulation circuit (the main energy accumulation unit (22)) and then to the voltage stabilizer (24). The diode D5 does not allow the higher voltage 2 from the converter (30) of the active state of the relay contacts to come to the output circuits of the converter (29) of the passive state of the relay contacts.

Detailed Description of Operation of Other Circuits of the Switch Electrical Circuit Both converters (29, 30) operate for one main energy accumulation module (22), and the voltage from the module further comes to the voltage stabilizer (24) that forms the required stable voltage V_MCU for powering the microcontroller (32) having the embedded radio module, the indication LEDs (37) and the touch buttons (49, 50).

Also, after the voltage stabilizer (24), the energy is accumulated in the additional energy accumulation module (23) that comprises a high-capacity electrolytic capacitor for switching between coils of the relay (20) with the flap which requires short high-energy impulses to switch them. The additional energy accumulation module (23) enables to decrease unwanted effects of surges of the general consumption current consumed by the electric circuit of the device.

The difference of levels of the power supply voltages 1 and 2 is used in the switch to determine a current state of the load in the embodiment, where the relay (20) is of the change-over type, in particular, when the microcontroller (32) fixes the level of the voltage 1, thus, the contact is closed and the load is enabled, if it fixes the level of the voltage 2, thus, the load is disabled. The overall voltage that is formed by both converters (29, 30) is measured by the microcontroller (32) by means of the circuit of the main energy accumulation module (22). It utilizes a high-resistance voltage divider that is connected to the microcontroller (32). Also, the measurement of this voltage allows a correct operation of coils of the relay (20) with the flap, the microcontroller (32) monitors the accumulation of the required voltage in the main energy accumulation module (22) and provides the control impulse for controlling the coils of the relay (20) only when this voltage is sufficient for the switching. The current is fed to the coil(s) of the relay (20) only for a short time at a moment of switching of the contacts by the coil(s) of the relay (20).

Also, the switch comprises a load current measurement circuit that is formed by circuits of the resistor and of the differential amplifier (27). The resistor acts as a current sensor, an alternating voltage drops on it and it is proportional to the current level that flows through the load. The differential amplifier (27) of the signal is formed on an operational amplifier from said resistor. A circuit for forming a constant signal offset is also formed on the operational amplifier in order to provide a correct measurement of the alternating current by the microcontroller. The measurement of current is used to protect the device against overload/overheating.

The invention claimed is:

1. A touch light switch comprising a first assembly (1) and a second assembly (2) that is detachably mounted on the first assembly (1); wherein the first assembly (1) comprises a shell (3), a power supply printed circuit board assembly (4), and a control printed circuit board assembly (5) that are arranged in the shell (3); wherein the shell (3) comprises a base (6) and a mounting pad (7); wherein the power supply printed circuit board assembly (4) comprises a voltage converters unit having two converters (29, 30); wherein the second assembly (2) comprises a touch display panel (11) and a touch printed circuit board assembly (12) that is connected to the touch display panel, and that is electrically connected to the control printed circuit board assembly (4) that is, in turn, electrically connected to the power supply printed circuit board assembly (4); wherein the touch printed circuit board assembly (12) comprises a touch area (13); wherein the second assembly (2) is detachably mounted on the first assembly (1) by a frame (8) that is attached along a circumference of the mounting pad (7) of the shell (3); wherein the mounting pad (7) comprises receiving recesses (18), and the frame (8) comprises attachment tools configured to fix to the touch display panel (11) that comprises touch areas formed as separate buttons; wherein the power supply printed circuit board assembly (4) comprises a power supply commutation relay unit (20) that is configured to change a number and a type of channels, a power supply connection terminals unit (21), an energy accumulation unit having a main energy accumulation module (22) and an additional energy accumulation module (23), a voltage stabilizer (24), a fuse (25), a current shunt (26), a differential amplifier (27), and a transistor (28); wherein the voltage converters unit is provided with two converters for a passive state (29) and for an active state (30) of the relay contacts of the power supply commutation relay unit (20), respectively; wherein the converter (29) for the passive state of the relay of the power supply commutation relay unit (20) is a low-power impulse converter having a designed transformer and a feedback assembly; and the power supply printed circuit board assembly (4) is connected, by means of connectors (31), to the control printed circuit board assembly (5) that comprises a microcontroller unit (32) having an embedded radio module, a balancing device unit (33), an anti-electrostatic interferences unit (34), a memory unit (35), a touch display panel areas adjustment unit (36) and an illumination and indication LEDs unit (37), as well as areas (38) for providing an electrical connection to the touch printed circuit board assembly (12), and recesses (40) that are provided along a circumference of the control printed circuit board (5); wherein the base (6) of the shell (3) is covered with a flat cap (41) having protrusions (42) provided along its circumference, and the protrusions have hooks configured to fix the cap (41) on an inner surface of the base (6) so as to enable clamping of the power supply printed circuit board (4) and the control printed circuit board (5), and protruding lenses (43) for the LEDs and openings (44) are provided in a central part of the cap (41); wherein the second assembly (2) further comprises a light guide (14) having recesses (15), attachment tools (16) configured to attach to the frame (8), and openings (17); wherein the touch printed circuit board assembly (12) that is arranged between the light guide (14) and the touch display panel (11) comprises openings (45), antenna pogo pins (46), and touch area (13) electrodes pogo pins (47) unit; wherein the antenna (48) is configured as a track on the touch printed circuit board (12), while the touch area (13) is configured as most of an area of the touch printed circuit board (12); wherein at least two electrodes pogo pins (47) of the touch area (13) are arranged in a central part of the touch printed circuit board (12), while at least two antenna pogo pins (46) are arranged on a diagonal of the touch printed circuit board (12), and said pogo pins (46, 47) come in contact with corresponding areas (38) of the control printed circuit board assembly (5) via the corresponding openings (17) provided in the light guide (14) and in the cap (41); and wherein the touch display panel (11) comprises attachment tools configured to attach to the frame (8) and attachment tools configured to attach to the mounting pad (7), which pass through said openings (45) provided in the touch printed circuit board assembly (12) and in the light guide (14), and are fixed in the receiving recesses (18).

2. The touch light switch according to claim 1, wherein the shell (3) is made of a white-colored LUPOY GN2106FD polycarbonate.

3. The touch light switch according to claim 1, wherein the rest of elements of the structure, except for the shell (3), are made of LUPOY EF1006F polycarbonate, while the flat cap (41) and the frame (8) are semi-transparent, the light guide (14) is transparent, and the touch printed circuit board (12) is white-colored.

4. The touch light switch according to claim 1, wherein the power supply commutation relay (20) unit comprises one relay.

5. The touch light switch according to claim 1, wherein the power supply commutation relay (20) unit comprises one change-over type relay.

6. The touch light switch according to claim 1, wherein the power supply commutation relay (20) unit comprises two relays.

7. The touch light switch according to claim 4, wherein the relay (20) is provided with a flap.

8. The touch light switch according to claim 1, wherein the main energy accumulation unit (22) and the additional energy accumulation unit (23) comprise an electrolytic capacitor.

9. The touch light switch according to claim 1, wherein the frame (8) is light-diffusing.

10. The touch light switch according to claim 1, wherein the touch display panel (11) is made as a single button (49).

11. The touch light switch according to claim 1, wherein the touch display panel (11) is made as two buttons (50) that are visually separated by a semi-transparent separating light guide (51) that is attached on the touch display panel (11).

12. The touch light switch according to claim 11, wherein the semi-transparent separating light guide (51), while passing via the touch printed circuit board (12), is arranged in a white insert (52) that is, in turn, inserted into the light guide (14).

13. The touch light switch according to claim 5, wherein the change-over type relay of the power supply commutation relay unit (20) is provided with a flap.

14. The touch light switch according to claim 6, wherein at least one relay of the two relays of the power supply commutation relay unit (20) is provided with a flap.

* * * * *